United States Patent
Yoon

(10) Patent No.: US 11,261,938 B2
(45) Date of Patent: Mar. 1, 2022

(54) ZIPPER CHAIN

(71) Applicant: HANWHA DEFENSE CO., LTD., Changwon-si (KR)

(72) Inventor: Young Ki Yoon, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 367 days.

(21) Appl. No.: 15/765,530

(22) PCT Filed: Nov. 29, 2016

(86) PCT No.: PCT/KR2016/013847
§ 371 (c)(1),
(2) Date: Dec. 18, 2018

(87) PCT Pub. No.: WO2017/122927
PCT Pub. Date: Jul. 20, 2017

(65) Prior Publication Data
US 2019/0113104 A1   Apr. 18, 2019

(30) Foreign Application Priority Data

Jan. 15, 2016  (KR) .................. 10-2016-0005329
Nov. 24, 2016  (KR) .................. 10-2016-0157436

(51) Int. Cl.
*F16G 13/20*   (2006.01)
*F16G 13/06*   (2006.01)

(52) U.S. Cl.
CPC ............. *F16G 13/20* (2013.01); *F16G 13/06* (2013.01)

(58) Field of Classification Search
CPC .......... F16G 13/20; F16G 13/06; F16G 13/04; F16G 13/18; F16G 13/07; F16G 13/14; F16G 15/00; F16G 15/04

(Continued)

(56) References Cited

U.S. PATENT DOCUMENTS

| 5,277,097 A | 1/1994 | Pehker | |
| 2004/0157691 A1* | 8/2004 | Olmsted | .................. F16H 7/06 474/152 |
| 2013/0205927 A1* | 8/2013 | Saji | ..................... F16H 19/0636 74/30 |

FOREIGN PATENT DOCUMENTS

| EP | 1484465 A1 * | 12/2004 | ............ E05F 15/619 |
| EP | 1484465 A1 | 12/2004 | |

(Continued)

OTHER PUBLICATIONS

Translation of WO-9207154-A1 (Year: 1992).*

(Continued)

*Primary Examiner* — Teresa M Ekiert
*Assistant Examiner* — Teresa A Guthrie
(74) *Attorney, Agent, or Firm* — Sughrue Mion, PLLC

(57) ABSTRACT

Provided is a zipper chain. The zipper chain includes a plurality of chain portions arranged to face each other and engaged with each other at one point while making linear movements. Each chain portion includes a plurality of upper plates connected to each other; a plurality of lower plates arranged to respectively face the upper plates, respectively spaced apart from the upper plates, and connected to each other; a plurality of connecting portions each connecting one of the upper plates to a corresponding one of the lower plates and connecting adjacent upper plates among the plurality of upper plates or adjacent lower plates among the plurality of lower plates; and a plurality of protrusions respectively protruding from the plurality of connecting portions.

8 Claims, 5 Drawing Sheets

(58) Field of Classification Search
USPC .............................................................. 59/84
See application file for complete search history.

(56) References Cited

FOREIGN PATENT DOCUMENTS

| JP | 2001241211 A | 9/2001 | | |
|---|---|---|---|---|
| JP | 2013057332 A | 3/2013 | | |
| KR | 1020100101521 A | 9/2010 | | |
| KR | 1020150079507 A | 7/2015 | | |
| WO | WO-9207154 A1 * | 4/1992 | ........... | E04H 12/185 |
| WO | WO-2016200081 A * | 12/2016 | ................ | B66F 7/00 |

OTHER PUBLICATIONS

International Search Report, issued by International Searching Authority in corresponding International Application No. PCT/KR/2016/013847, dated Feb. 10, 2017.

* cited by examiner

ZIPPER CHAIN

TECHNICAL FIELD

The present disclosure relates to a device, and more particularly, to a zipper chain.

BACKGROUND ART

A zipper chain is a device in which separate chain portions are engaged with each other and deliver a force to an external device. Zipper chains can be used in various industrial fields. For example, a zipper chain may be used in an automatic loading device for military purposes or may be used as a device delivering a force in a machine tool.

At this time, a zipper chain may have various structures for accurate force transmission. For example, there may be a structure in which protrusions are formed in plates connected to each other and recesses receiving the protrusions are formed in chain portions facing each other so that the protrusions and the recesses combine to form a zipper chain. There may be another structure in which protrusions protruding from chain portions combine to form a zipper chain.

DESCRIPTION OF EMBODIMENTS

Technical Problem

Apart from the above-described configurations, a lot of research and development has been carried out to create a zipper chain that delivers a large force with small driving power or delivers a force in various directions. The zipper chain is disclosed in detail in US 2004-0157691 (entitled "Zipper Chain Drive Assembly" and applied by the Chamberlain Group, Inc.).

Solution to Problem

Provided is a zipper chain.

According to an aspect of the present disclosure, there is provided a zipper chain including a plurality of chain portions arranged to face each other and engaged with each other at one point while making linear movements, wherein each chain portion includes a plurality of upper plates connected to each other; a plurality of lower plates arranged to respectively face the upper plates, respectively spaced apart from the upper plates, and connected to each other; a plurality of connecting portions each connecting one of the upper plates to a corresponding one of the lower plates and connecting adjacent upper plates among the plurality of upper plates or adjacent lower plates among the plurality of lower plates; and a plurality of protrusions respectively protruding from the plurality of connecting portions.

Advantageous Effects of Disclosure

Embodiments of the present disclosure enable a force to be accurately delivered. Embodiments of the present disclosure may also prevent physical malfunction by preventing chain portions facing each other from being disengaged from each other even in case of distortion.

BEST MODE

Figure 1:
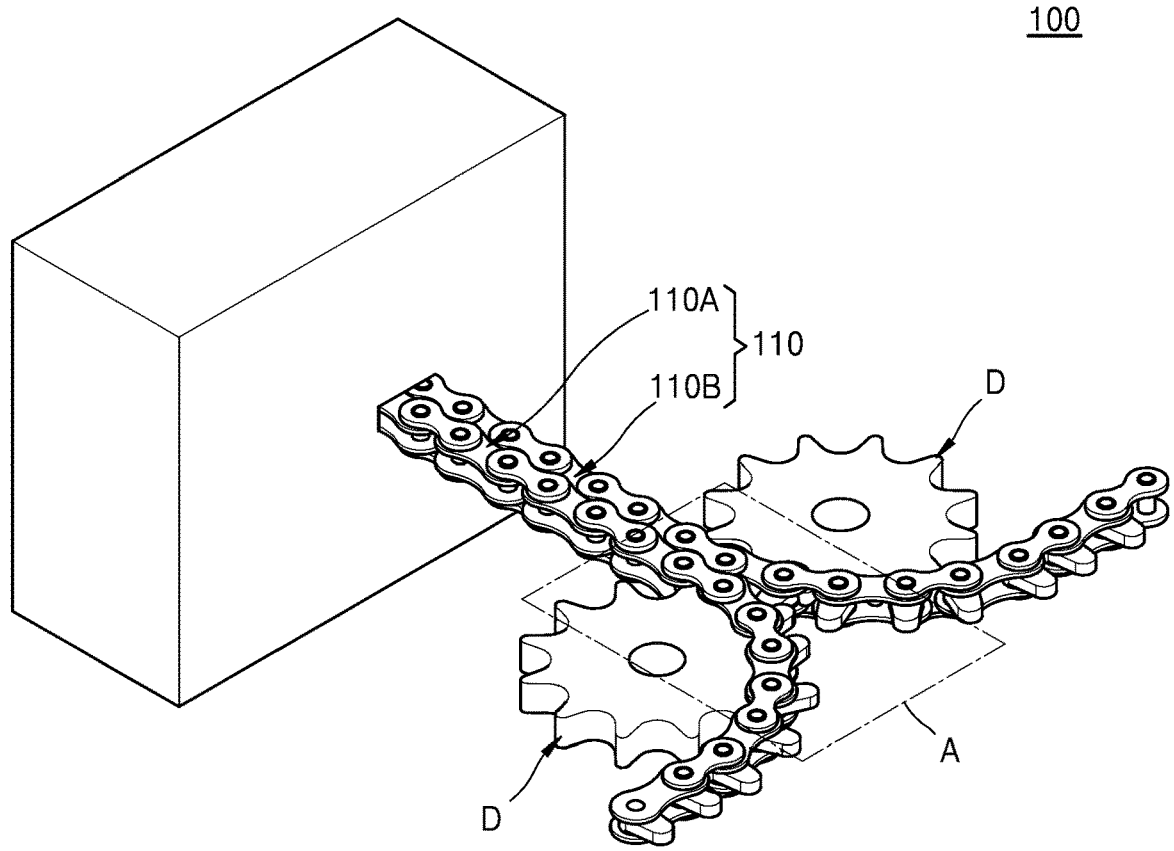
FIG. 1 is a perspective view of a zipper chain according to some embodiments of the present disclosure.

According to an aspect of the present disclosure, there is provided a zipper chain including a plurality of chain portions arranged to face each other and engaged with each other at one point while making linear movements, wherein each chain portion includes a plurality of upper plates connected to each other; a plurality of lower plates arranged to respectively face the upper plates, respectively spaced apart from the upper plates, and connected to each other; a plurality of connecting portions each connecting one of the upper plates to a corresponding one of the lower plates and connecting adjacent upper plates among the plurality of upper plates or adjacent lower plates among the plurality of lower plates; and a plurality of protrusions respectively protruding from the plurality of connecting portions.

An end of each of the protrusions may be round.

The plurality of chain portions may include a first chain portion and a second chain portion arranged to face the first chain portion.

A protrusion of the first chain portion may be inserted in a space between an upper plate and a lower plate of the second chain portion, and a protrusion of the second chain portion may be inserted in a space between an upper plate and a lower plate of the first chain portion.

The protrusion of the first chain portion may be inserted in a space between adjacent connecting portions of the second chain portion.

The protrusion of the second chain portion may be inserted in a space between adjacent connecting portions of the first chain portion.

An upper plate of the first chain portion and an upper plate of the second chain portion may be arranged to alternate with each other The protrusion of the first chain portion may be inserted in a space between adjacent protrusions of the second chain portion.

The protrusion of the second chain portion may be inserted in a space between adjacent protrusions of the first chain portion.

The protrusions may be inserted in the chain portions facing each other and at least a portion of each protrusion may be obliquely formed.

At least one of the upper plates and the lower plates may include an inserted portion protruding outward and a receiving portion recessed inwardly.

An inserted portion of one of the chain portions may be inserted in a receiving portion of another adjacent one of the chain portions.

At least two inserted portions of one of the chain portions may be inserted in a receiving portion of another adjacent one of the chain portions.

Mode of Disclosure

The present disclosure will be clear with reference to embodiments which will be described in detail together with the accompanying drawings. However, the present disclosure should not be construed as being limited to the embodiments but may be embodied in many different forms. The present embodiments are provided so that this disclosure will be thorough and complete, and will fully convey the scope of the present disclosure to those skilled in the art. The present disclosure will be defined by the appended claims. The terminology used herein is for the purpose of describing embodiments only and is not intended to be limiting of the present disclosure. As used herein, the singular forms "a", "an" and "the" are intended to include the plural forms as well, unless the context clearly indicates otherwise. The terms "comprises" and/or "comprising" specify the presence of elements, steps, operations, and/or components but do not preclude the presence or addition of one or more other elements, steps, operations, and/or components. It will be understood that, although the terms first, second, etc. may be used herein to describe various elements, these elements should not be limited by these terms. These terms are only used to distinguish one element from another.

Figure 2:
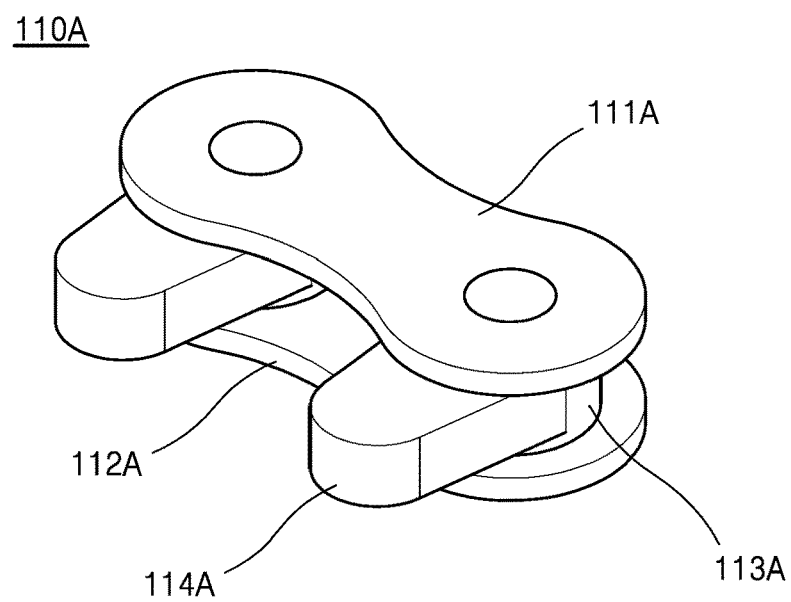
FIG. 2 is a partial perspective view of a first chain portion of FIG. 1.
Figure 3:
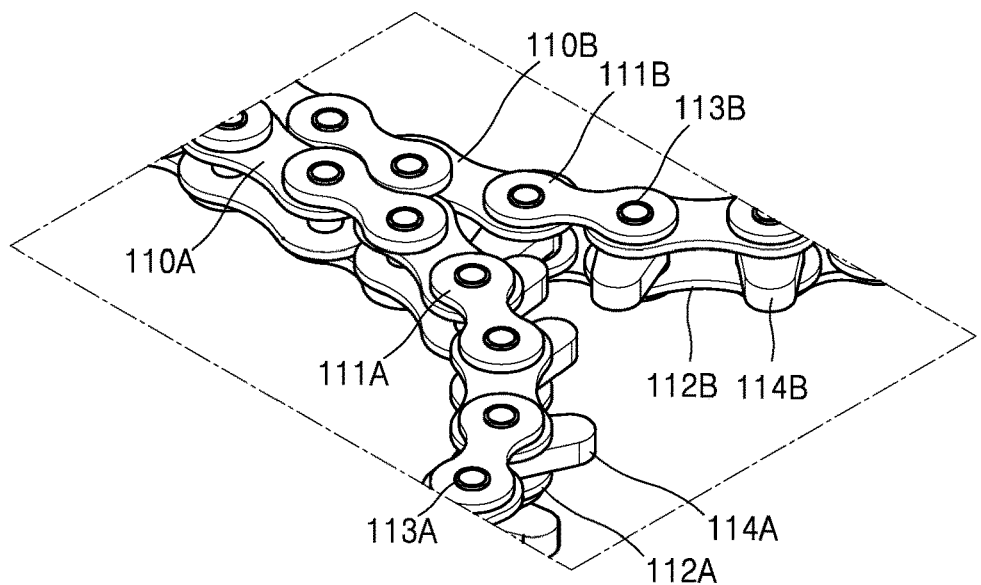
FIG. 3 is an enlarged perspective view of region A in FIG. 1.

FIG. 1 is a perspective view of a zipper chain according to some embodiments of the present disclosure. FIG. 2 is a partial perspective view of a first chain portion of FIG. 1. FIG. 3 is an enlarged perspective view of region A in FIG. 1.

Referring to FIGS. 1 through 3, a zipper chain 100 may include a plurality of chain portions 110 engaged with each other at one point. The chain portions 110 may include a first chain portion 110A and a second chain portion 110B. The first chain portion 110A and the second chain portion 110B may be arranged to face each other and may be engaged with each other at a certain point to form the zipper chain 100. The first chain portion 110A is the same as or similar to the second chain portion 110B, and therefore, descriptions will be focused on the first chain portion 110A below.

The first chain portion 110A may include a first upper plate 111A, a first lower plate 112A, a first connecting portion 113A, and a first protrusion 114A.

A plurality of first upper plates 111A may be provided to be connected to each other. At this time, the first upper plates 111A may be arranged in a line and may rotate relative to each other around a connected point. The first upper plates 111A may be arranged in a zigzag pattern with a height difference. For example, a first one of the first upper plates 111A may be placed higher than a second one of the first upper plates 111A and connected to the second one. Thereafter, a third one of the first upper plates 111A may be placed lower than the second one. This arrangement may be applied to the entirety of the first chain portion 110A. In this case, some of the first upper plates 111A may be provided on a different plane than the others of the first upper plates 111A and may be respectively connected to the others.

Each of the first upper plates 111A may have a recess in the central portion thereof. In particular, each first upper plate 111A may have a smaller width in the central portion than in any other portions.

The first lower plate 112A may be arranged to face the first upper plate 111A. The first lower plate 112A may be formed to be the same as or similar to the first upper plate 111A.

A plurality of first lower plates 112A may be provided. The first lower plates 112A may be connected to each other to be movable relative to each other. Since the arrangement or placement of the first lower plates 112A is the same as or similar to that of a plurality of the first upper plates 111A, descriptions thereof will be omitted.

The first connecting portion 113A may connect the first upper plate 111A to the first lower plate 112A. At this time, a plurality of first connecting portions 113A may be provided spaced apart from each other. In particular, a space may be formed between first connecting portions 113A spaced apart from each other.

Each first connecting portion 113A may connect adjacent first upper plates 111A to each other and adjacent first lower plates 112A to each other to be rotatable relative to each other.

The first protrusion 114A may protrude from the first connecting portion 113A. At this time, a plurality of first protrusions 114A may respectively protrude from a plurality of the first connecting portions 113A.

The first protrusion 114A may be round at an end. The first protrusion 114A may have at least one surface which obliquely extends from the first connecting portion 113A. In particular, a side surface of the first protrusion 114A facing the first connecting portion 113A may be obliquely formed. Accordingly, the width of the first protrusion 114A may decrease away from the first connecting portion 113A toward the end.

The first protrusion 114A may be provided on a different plane than the first upper plate 111A and the first lower plate 112A. In other words, the first protrusion 114A may be provided between the first upper plate 111A and the first lower plate 112A.

In the operation of the zipper chain 100, the first chain portion 110A and the second chain portion 110B may be respectively connected to and moved by separate driving parts D. At this time, each of the driving parts D may include a motor and a gear. The first chain portion 110A or the second chain portion 110B may be moved when the gear interlocks with the first chain portion 110A or the second chain portion 110B.

When the driving parts D operate as described above, the first chain portion 110A and the second chain portion 110B may be moved in one direction. At this time, an end of the first chain portion 110A and an end of the second chain portion 110B may be connected to each other or to a separate device.

When the first chain portion 110A and the second chain portion 110B are moved by the driving parts D, the first chain portion 110A and the second chain portion 110B may meet and be engaged with each other at a certain point.

In detail, when the first chain portion 110A and the second chain portion 110B are moved to meet each other, the first protrusion 114A may enter a space among a second connecting portion 113B, a second upper plate 111B, and a second lower plate 112B. In addition, a second protrusion 114B may enter a space among the first connecting portion 113A, the first upper plate 111A, and the first lower plate 112A. In this case, the first protrusion 114A may enter between two adjacent second protrusions 114B and the second protrusion 114B may enter between two adjacent first protrusions 114A. At this time, the first protrusion 114A and the second protrusion 114B may be completely inserted in the second chain portion 110B and the first chain portion 110A, respectively.

When the first protrusion 114A and the second protrusion 114B are inserted as described above, interference may occur between the first protrusion 114A and the second protrusion 114B. At this time, since the end of the first protrusion 114A and the end of the second protrusion 114B are round, interference between the first protrusion 114A and the second protrusion 114B may be minimized at the initial entrance of the first protrusion 114A and the second protrusion 114B. In addition, side surfaces of each of the first protrusion 114A and the second protrusion 114B are obliquely formed so as to guide the insertion of the first protrusion 114A and the second protrusion 114B, the side surfaces facing each other. In particular, when the first protrusion 114A and the second protrusion 114B are alternately inserted, an interlock error occurring due to the rotary motion of the first protrusion 114A and the second protrusion 114B may be prevented.

The work described above may be continuously performed during the operation of the driving parts D. At this time, the first upper plate 111A and the second upper plate 111B may be alternately provided. The first lower plate 112A and the second lower plate 112B may also be alternately provided.

In particular, the first upper plate 111A and the second upper plate 111B may be alternately provided such that a projecting portion of the second upper plate 111B is set in a recess of the first upper plate 111A and a projecting portion of the first upper plate 111A is set in a recess of the second upper plate 111B.

When the first chain portion 110A and the second chain portion 110B are engaged with each other in the manner described above and work, the first chain portion 110A and the second chain portion 110B may be distorted with respect to each other, or the first protrusion 114A or the second protrusion 114B may be displaced from the initial position thereof, due to external force or the like. At this time, the first protrusion 114A and the second protrusion 114B may have been alternately inserted, and the top, bottom, right, and left sides of the first protrusion 114A may be held by the second upper plate 111B, the second lower plate 112B, and the second connecting portion 113B and the top, bottom, right, and left sides of the second protrusion 114B may be held by the first upper plate 111A, the first lower plate 112A, and the first connecting portion 113B.

Accordingly, the zipper chain 100 may accurately deliver a force by preventing the first chain portion 110A and the second chain portion 110G from being disengaged from each other when the first chain portion 110A and the second chain portion 110G are supposed to be engaged with each other. In addition, the zipper chain 100 may prevent malfunction or error of an external system, in which the zipper chain 100 is installed, by preventing the first chain portion 110A and the second chain portion 110G from being disengaged from each other due to distortion by an external force.

The zipper chain 100 may deliver a force in various directions by providing a sturdy coupling using a simple structure.

Figure 4:
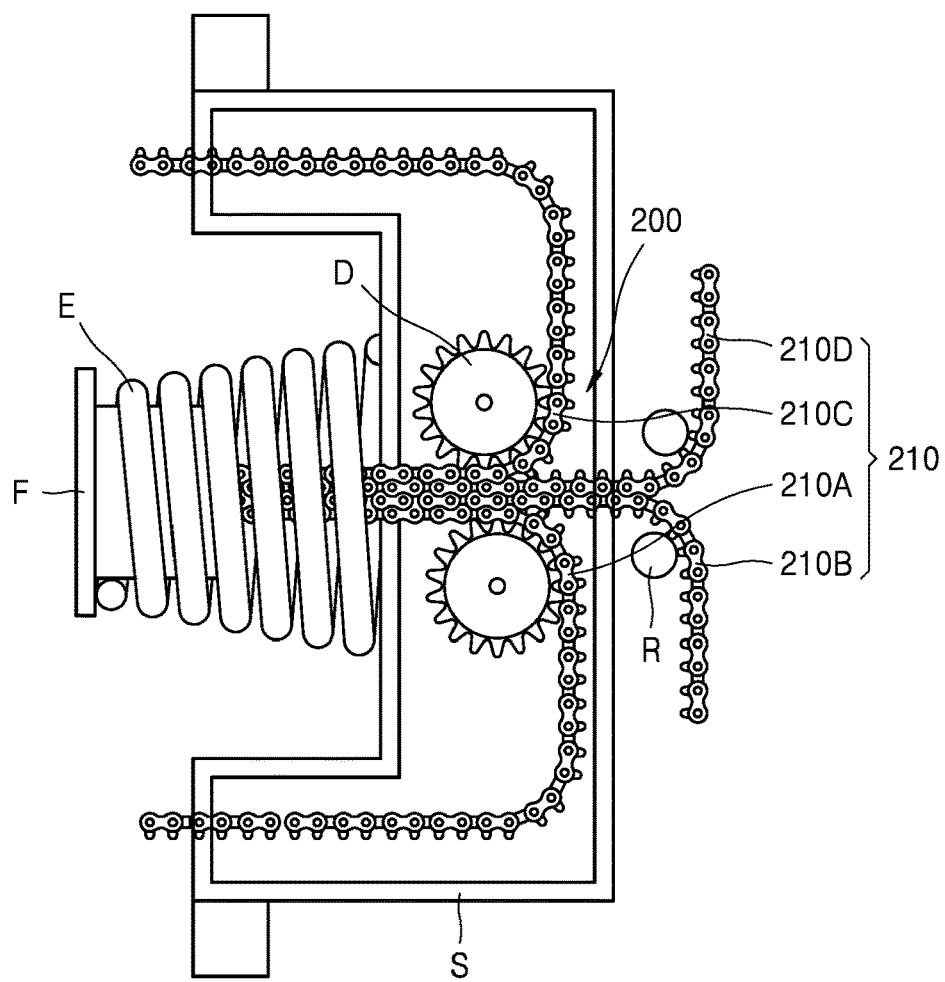
FIG. 4 is a front view of a transfer system equipped with a zipper chain according to other embodiments of the present disclosure.
Figure 5:
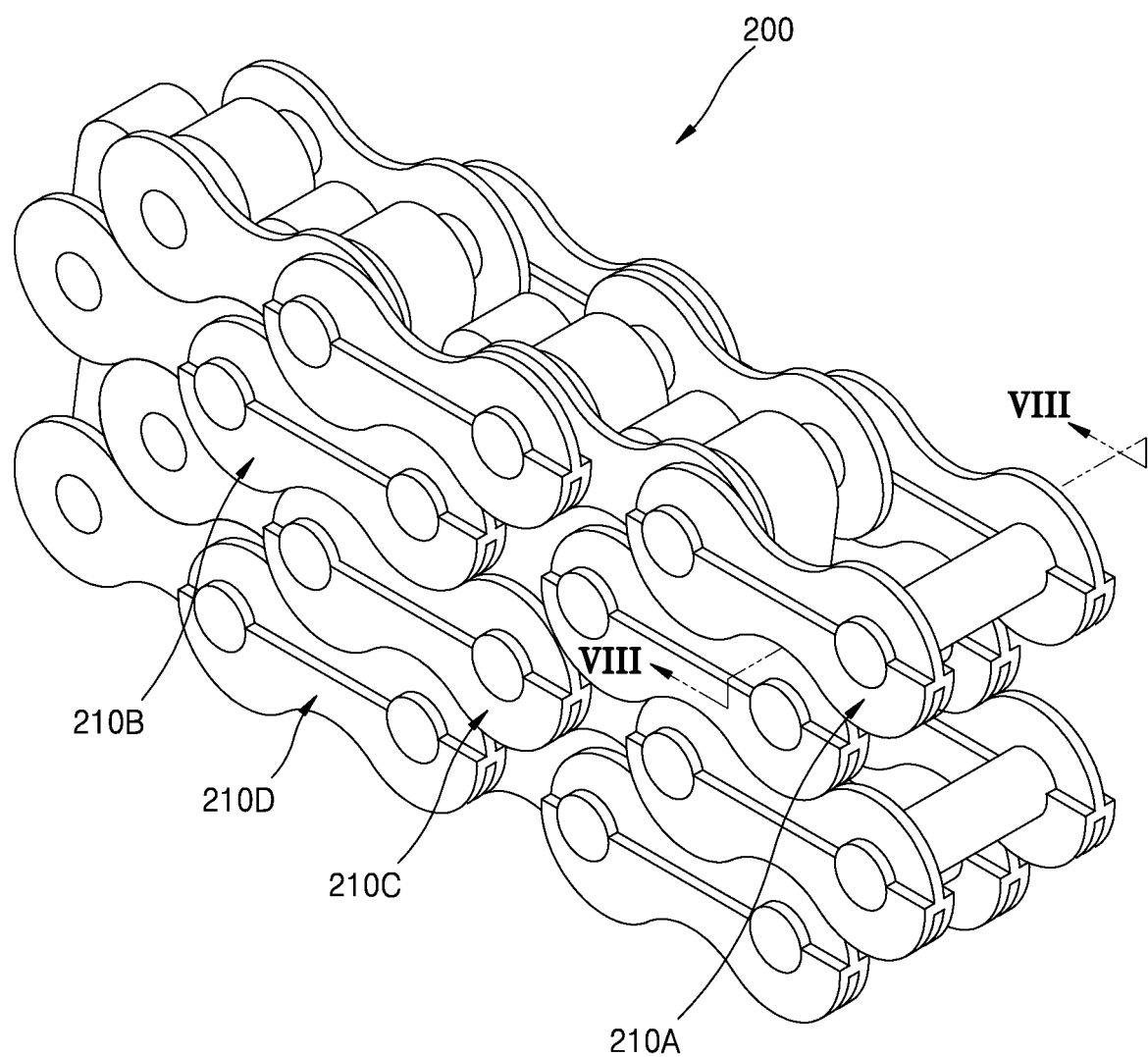
FIG. 5 is a partial perspective view of the zipper chain shown in FIG. 4.
Figure 6:
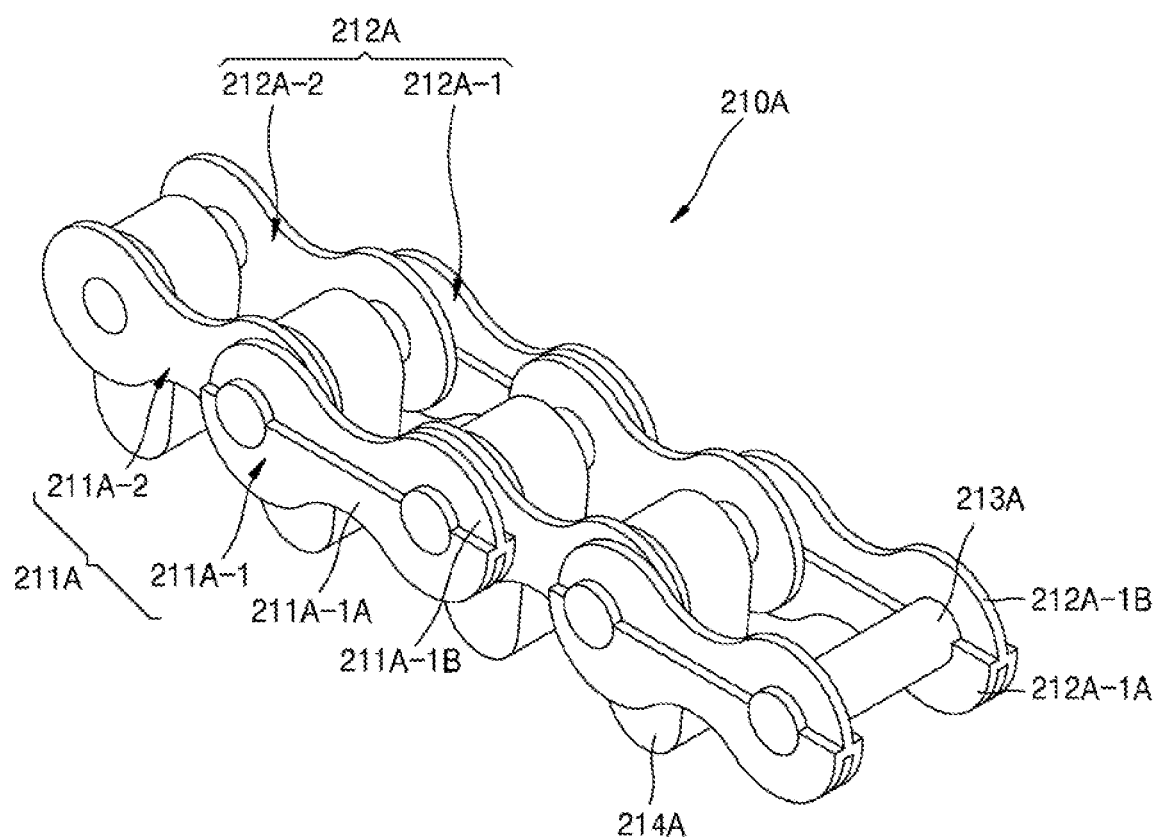
FIG. 6 is a perspective view of a first chain portion shown in FIG. 5.
Figure 7:
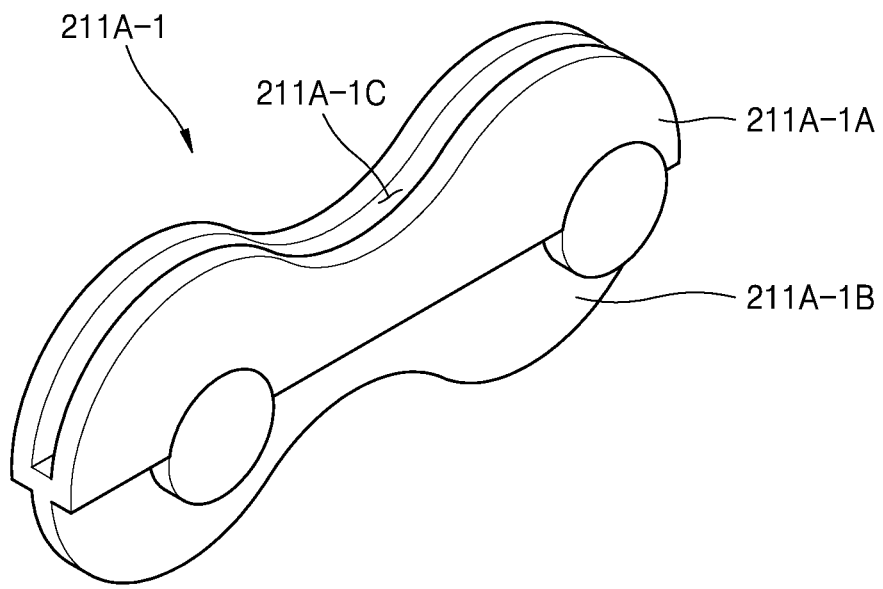
FIG. 7 is a perspective view of a first upper plate shown in FIG. 6.
Figure 8:
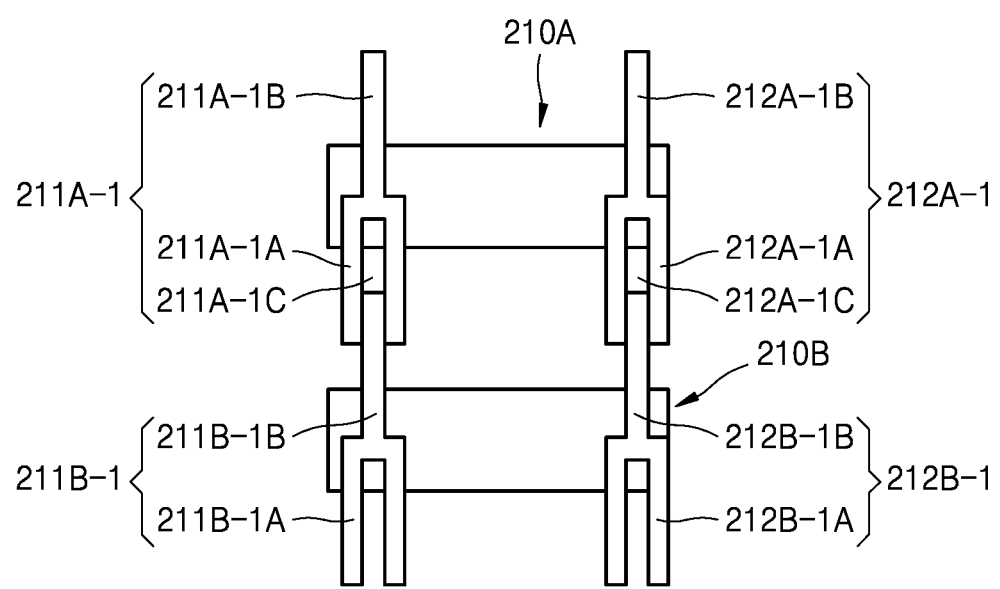
FIG. 8 is a cross-sectional view of the zipper chain, taken along line VIII-VIII in FIG. 5.

FIG. 4 is a front view of a transfer system equipped with a zipper chain according to other embodiments of the present disclosure. FIG. 5 is a partial perspective view of the zipper chain shown in FIG. 4. FIG. 6 is a perspective view of a first chain portion shown in FIG. 5. FIG. 7 is a perspective view of a first upper plate shown in FIG. 6. FIG. 8 is a cross-sectional view of the zipper chain, taken along line VIII-VIII in FIG. 5.

Referring to FIGS. 4 through 8, a zipper chain 200 may include a plurality of chain portions 210 engaged with each other. The chain portions 210 may include a first chain portion 210A, a second chain portion 210B, a third chain portion 210C, and a fourth chain portion 210D. The first through fourth chain portions 210A through 210D may be engaged with one another. For example, the first chain portion 210A may be engaged with the second chain portion 210B, the second chain portion 210B may be engaged with the third chain portion 210C, and the third chain portion 210C may be engaged with the fourth chain portion 210D. At this time, the first through fourth chain portions 210A through 210D may be the same as or similar to one another, and therefore, descriptions will be focused on the first chain portion 210A.

The first chain portion 210A may include a first upper plate 211A, a first lower plate 212A, a first connecting portion 213A, and a first protrusion 214A. The first connecting portion 213A and the first protrusion 214A are the same as or similar to the first connecting portion 113A and the first protrusion 114A described with reference to FIGS. 1 through 3, and therefore, detailed descriptions thereof will be omitted.

The first upper plate 211A may include a first upper outer plate 211A-1 and a first upper inner plate 211A-2 which are arranged with a height difference. At this time, the first upper outer plate 211A-1 may be provided on a different plane than the first upper inner plate 211A-2. In particular, the first upper outer plate 211A-1 may be provided further out than the first upper inner plate 211A-2, so that the first upper outer plate 211A-1 and the first upper inner plate 211A-2 may be arranged with a height difference therebetween.

The first upper outer plate 211A-1 and the first upper inner plate 211A-2 may be alternately arranged. At this time, the first upper outer plate 211A-1 may be connected to the first upper inner plate 211A-2 by the first connecting portion 213A.

The first upper outer plate 211A-1 may include a first upper receiving portion 211A-1A and a first upper inserted portion 211A-1B. At this time, a first upper insertion groove 211A-1C may be formed in the first upper receiving portion 211A-1A. The first upper inserted portion 211A-1B may be formed to protrude from the first upper receiving portion 211A-1A in a direction opposite to the first upper insertion groove 211A-1C.

The first lower plate 212A may include a first lower outer plate 212A-1 and a first lower inner plate 212A-2. At this time, the first lower outer plate 212A-1 may be formed to be the same as or similar to the first upper outer plate 211A-1, and the first lower inner plate 212A-2 may be formed to be the same as or similar to the first upper inner plate 211A-2.

For example, the first lower outer plate 212A-1 may include a first lower receiving portion 212A-1A and a first lower inserted portion 212A-1B. At this time, a first lower insertion groove 212A-1C may be formed in the first lower receiving portion 212A-1A.

The zipper chain 200 may be installed in various systems. For example, the zipper chain 200 may be installed in a system transferring objects. In particular, the zipper chain 200 may transfer a heavy-weight object by applying a force to the object. However, detailed descriptions below will be focused on a case in which the zipper chain 200 is used in a system which transfers at least one among a shell and a charge.

The system described above may include a seating part F on which at least one among a shell and a charge is seated and an elastic part E providing a restorative force to the seating part F. The system may also include a supporting part S on which the elastic part E is settled, a driving part D moving the first chain portion 210A and the fourth chain portion 210D, and a rotating part R contacting the second chain portion 210B and the third chain portion 210C.

The first through fourth chain portions 210A through 210D, which have been separated from one another, may be engaged with one another. At this time, ends of the respective first through fourth chain portions 210A through 210D may have been coupled to an object or a component that applies a force, and the first through fourth chain portions 210A through 210D coupled to the object or the component may have been engaged with one another. Alternatively, the first chain portion 210A has been engaged with the second chain portion 210B and the third chain portion 210C has been engaged with the fourth chain portion 210D. Thereafter, the first through fourth chain portions 210A through 210D may be engaged with one another. Hereinafter, descriptions will be focused on a case where the first through fourth chain portions 210A through 210D, which have been separated from one another, are engaged with one another, for convenience's sake.

The first chain portion 210A and the second chain portion 210B may be engaged with each other first. At this time, a portion of the first chain portion 210A may have been engaged with a portion of the second chain portion 210B. Another portion of the first chain portion 210A and another portion of the second chain portion 210B may have been separated from each other and may be engaged with each other as the first chain portion 210A and the second chain portion 210B are moved. In this case, the first chain portion 210A may be moved by the driving part D. At this time, the driving part D may have a form of a sprocket, and a motor and a decelerator may be connected to the sprocket. The second chain portion 210B may be in contact with the rotating part R, such as a sprocket or a roller, between the first chain portion 210A and the second chain portion 210B when the second chain portion 210B is moved. At this time, the rotating part R contacting the second chain portion 210B may be connected to a separate motor or may not be connected to a motor but may be passively rotated by the movement of the first chain portion 210A. For convenience's sake, detailed descriptions will focused on a case where the first chain portion 210A is moved by the driving part D and the second chain portion 210B contacts a roller, i.e., the rotating part R.

In this case, the first chain portion 210A and the second chain portion 210B may be engaged with each other in a manner similar to that described with reference to FIGS. 1 through 3. In detail, a portion of the first protrusion 214A of the first chain portion 210A may be inserted in a space between a second upper inner plate and a second lower inner plate, and another portion of the first protrusion 214A may be inserted in a space between a second upper outer plate 211B-1 and a second lower outer plate 212B-1. In addition, a second upper inserted portion 211B-1B may be inserted in the first upper receiving portion 211A-1A, and a second lower inserted portion 212B-1B may be inserted in the first lower receiving portion 212A-1A. At this time, the first upper receiving portion 211A-1A and the second upper inserted portion 211B-1B may have been arranged to face each other, and the first lower receiving portion 212A-1A and the second lower inserted portion 212B-1B may have been arranged to face each other.

During the process described above, the third chain portion 210C and the fourth chain portion 210D may also be engaged with each other. The engagement between the third chain portion 210C and the fourth chain portion 210D is the same as or similar to the engagement between the first chain portion 210A and the second chain portion 210B, which has been described above, and therefore, detailed description thereof will be omitted. In this case, the fourth chain portion 210D may be connected to the driving part D so as to be moved, and similarly to the second chain portion 210B, the third chain portion 210C may be in contact with the rotating part R, such as a sprocket or a roller, which passively moves.

While the first and second chain portions 210A and 210B are engaged with each other and the third and fourth chain portions 210C and 210D are engaged with each other, the second chain portion 210B and the third chain portion 210C may be engaged with each other.

In detail, a third upper inserted portion (not denoted by a reference sign) may be inserted in a second upper receiving portion 211B-1A. At this time, the second upper receiving portion 211B-1A may be coupled to third upper inserted portions adjacent to each other. In other words, the second upper receiving portion 211B-1A may be coupled to two third upper inserted portions adjacent to each other. In addition, a third lower inserted portion (not shown) may be inserted in a second lower receiving portion 212B-1A.

The first through fourth chain portions 210A through 210D engaged with one another as described above may be disengaged from one another. Disengagement may be performed in a manner reverse to that described above. In detail, the second chain portion 210B and the third chain portion 210C may be disengaged from each other first. At this time, the third upper inserted portions may be separated from the second upper receiving portion 211B-1A.

After the second chain portion 210B is disengaged from the third chain portion 210C, the first chain portion 210A and the second chain portion 210B may be disengaged from each other and the third chain portion 210C and the fourth chain portion 210D may be disengaged from each other.

In detail, during the disengagement between the first chain portion 210A and the second chain portion 210B, firstly, the first protrusion 214A may be withdrawn from a space between a second upper plate (not denoted) and a second lower plate (not denoted) and a second protrusion (not denoted) may be withdrawn from a space between the first upper plate 211A and the first lower plate 212A. At this time, the second upper inserted portion 211B-1B may be withdrawn from the first upper receiving portion 211A-1A and the second lower inserted portion 212B-1B may be withdrawn from the first lower receiving portion 212A-1A. This process may be performed continuously during the disengagement between the first chain portion 210A and the second chain portion 210B. The third chain portion 210C and the fourth chain portion 210D may be disengaged from each other in a manner which is the same as or similar to the manner in which the first chain portion 210A and the second chain portion 210B are disengaged from each other.

The zipper chain 200 may accurately deliver a force since the first through fourth chain portions 210A through 210D are not separated from one another when they are engaged with one another and apply the force to an external object. In addition, the zipper chain 200 couples the first through fourth chain portions 210A through 210D to one another using inserted portions and receiving portions, thereby preventing at least one of the first through fourth chain portions 210A through 210D from being distorted.

The zipper chain 200 enables a plurality of chain portions to be coupled to each other in the structure described above, thereby providing a form optimized to various forces.

Meanwhile, an inserted portion and a receiving portion of the zipper chain 200 are not limited to the positions described above but may be formed in a manner reverse to that described above. At this time, as long as the inserted portion and the receiving portion are arranged to face each other, an operation which is the same as or similar to that described above may be performed.

While the present disclosure has been described with reference to the embodiments thereof, various changes or modifications may be made therein without departing from the spirit and scope of the present disclosure. Accordingly, the scope of the following claims includes these changes or modifications that do not depart from the spirit of the present disclosure.

INDUSTRIAL APPLICABILITY

According to an embodiment of the present disclosure, there is provided a zipper chain accurately delivering a force, so that embodiments of the present disclosure may be applied to weaponry, industrial machinery, vessels, automobiles, etc.

The invention claimed is:

1. A zipper chain comprising a plurality of chain portions arranged to face each other and configured to engage with each other at one point in time while making linear movements,
wherein each chain portion comprises:
a plurality of upper plates connected to each other;
a plurality of lower plates arranged to respectively face the upper plates, respectively spaced apart from the upper plates, and connected to each other;
a plurality of connecting portions each connecting one of the upper plates to a corresponding one of the lower plates and connecting adjacent upper plates among the plurality of upper plates or adjacent lower plates among the plurality of lower plates; and
a plurality of protrusions respectively protruding from the plurality of connecting portions,
wherein the plurality of chain portions comprises:
a first chain portion; and
a second chain portion arranged to face the first chain portion, and
wherein a protrusion, from among the plurality of protrusions of the first chain portion, is inserted in a space that is directly between an upper plate and a lower plate of the second chain portion and directly between centers of two adjacent connecting portions from among the plurality of connecting portions of the second chain portion, and a protrusion, from among the plurality of protrusions of the second chain portion, is inserted in a space that is directly between an upper plate and a lower plate of the first chain portion and directly between two adjacent connecting portions from among the plurality of connecting portions of the first chain portion,
wherein each protrusion of the plurality of protrusions of the first chain portion and the plurality of protrusions of the second chain portion comprises a first side surface and a second side surface, opposite of the first side surface, that are obliquely formed towards an end of the protrusion,
wherein the first side surface of the protrusion from among the plurality of protrusions of the first chain portion faces the first side surface of the protrusion from among the plurality of protrusions of the second chain portion, such that the protrusion from among the plurality of protrusions of the first chain portion and the protrusion from among the plurality of protrusions of the second chain portion are configured to guide insertion of each other into the first chain portion and the second chain portion, respectively,
wherein one of the upper plates or one of the lower plates of the first chain portion comprises a receiving portion that is a groove recessed inwardly in a first direction, between two inner walls of the one of the upper plates or of the one of the lower plates that face each other in a second direction, and extends within the one of the upper plates or the one of the lower plates in a third direction,
wherein the first direction, the second direction, and the third direction are perpendicular to each other,
wherein a distance between the two inner walls in the second direction is constant along the first direction,
wherein the second direction is perpendicular to an extending direction of the first chain portion and extends towards the one of the upper plates of the first chain portion from the one of the lower plates of the first chain portion, and
wherein one of the upper plates or one of the lower plates of the second chain portion comprises an inserted portion protruding outward and that is inserted in the receiving portion of the first chain portion.

2. The zipper chain of claim 1, wherein the end of each of the protrusions is round.

3. The zipper chain of claim 2, wherein an upper plate from among the plurality of upper plates of the first chain portion and an upper plate from among the plurality of upper plates of the second chain portion are arranged to alternate with each other.

4. The zipper chain of claim 2, wherein the protrusion from among the plurality of protrusions of the first chain portion is inserted in a space between adjacent protrusions from among the plurality of protrusions of the second chain portion.

5. The zipper chain of claim 2, wherein the protrusion from among the plurality of protrusions of the second chain portion is inserted in a space between adjacent protrusions from among the plurality of protrusions of the first chain portion.

6. The zipper chain of claim 1, wherein the protrusions are inserted in the chain portions facing each other.

7. A zipper chain comprising a plurality of chain portions arranged to face each other and configured to engage with each other at one point in time while making linear movements,
wherein each chain portion comprises:
a plurality of upper plates connected to each other;
a plurality of lower plates arranged to respectively face the upper plates, respectively spaced apart from the upper plates, and connected to each other;
a plurality of connecting portions each connecting one of the upper plates to a corresponding one of the lower plates and connecting adjacent upper plates among the plurality of upper plates or adjacent lower plates among the plurality of lower plates; and
a plurality of protrusions respectively protruding from the plurality of connecting portions,
wherein one of the upper plates or one of the lower plates of one of the chain portions comprises an inserted portion protruding outward, wherein one of the upper plates or one of the lower plates of another one of the chain portions, adjacent to the one of the chain portions, comprises a receiving portion that is a groove recessed inwardly in a first direction, between two inner walls of the one of the upper plates or of the one of the lower plates that face each other in a second direction, and extends within the one of the upper plates or the one of the lower plates in a third direction, wherein the inserted portion of the one of the chain portions is inserted in the receiving portion of the another one of the chain portions, wherein the first direction, the second direction, and the third direction are perpendicular to each other, wherein a distance between the two inner walls in the second direction is constant along the first direction, and wherein the second direction is perpendicular to an extending direction of the another one of the chain portions and extends towards the one of the upper plates from the one of the lower plates.

8. A zipper chain comprising a plurality of chain portions arranged to face each other and configured to engage with each other at one point in time while making linear movements, wherein each chain portion comprises:
a plurality of upper plates connected to each other;
a plurality of lower plates arranged to respectively face the upper plates, respectively spaced apart from the upper plates, and connected to each other;
a plurality of connecting portions each connecting one of the upper plates to a corresponding one of the lower plates and connecting adjacent upper plates among the plurality of upper plates or adjacent lower plates among the plurality of lower plates; and
a plurality of protrusions respectively protruding from the plurality of connecting portions, wherein at least two inserted portions protruding outward are each provided in a respective one of the upper plates or the lower plates of one of the chain portions, wherein one of the upper plates or one of the lower plates of another one of the chain portions, adjacent to the one of the chain portions, comprises a receiving portion that is a groove recessed inwardly in a first direction, between two inner walls of the one of the upper plates or of the one of the lower plates that face each other in a second direction, and extends within the one of the upper plates or the one of the lower plates in a third direction, wherein the at least two inserted portions of the one of the chain portions face the receiving portion of the another one of the chain portions, wherein the first direction, the second direction, and the third direction are perpendicular to each other, wherein a distance between the two inner walls in the second direction is constant along the first direction, and wherein the second direction is perpendicular to an extending direction of the another one of the chain portions and extends towards the one of the upper plates from the one of the lower plates.

* * * * *